US011847815B2

United States Patent
Ko

(10) Patent No.: US 11,847,815 B2
(45) Date of Patent: Dec. 19, 2023

(54) ELECTRONIC DEVICE, SERVER, AND SIGNATURE AUTHENTICATION METHOD USING THE SAME

(71) Applicant: SAMSUNG ELECTRONICS CO., LTD., Suwon-si (KR)

(72) Inventor: Baek Seok Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 17/281,772

(22) PCT Filed: Sep. 27, 2019

(86) PCT No.: PCT/KR2019/012647
§ 371 (c)(1),
(2) Date: Mar. 31, 2021

(87) PCT Pub. No.: WO2020/071693
PCT Pub. Date: Apr. 9, 2020

(65) Prior Publication Data
US 2021/0390293 A1    Dec. 16, 2021

(30) Foreign Application Priority Data
Oct. 1, 2018  (KR) .................. 10-2018-0116851

(51) Int. Cl.
*G06V 30/18*     (2022.01)
*G06V 10/74*     (2022.01)
*G06V 30/32*     (2022.01)

(52) U.S. Cl.
CPC ............ *G06V 10/761* (2022.01); *G06V 30/32* (2022.01); *G06V 30/347* (2022.01); *G06V 30/36* (2022.01)

(58) Field of Classification Search
CPC ... G06V 30/32–387; G06V 40/30–394; G06V 30/10; G06K 9/00
See application file for complete search history.

(56) References Cited

U.S. PATENT DOCUMENTS 5,150,420 A      9/1992  Haraguchi
5,699,455 A *   12/1997  Arai ..................... G06K 9/6255
                                                                 382/187
(Continued)

FOREIGN PATENT DOCUMENTS

| EP | 2397971 A1 * | 12/2011 | ......... G06K 9/00429 |
| JP | 2018-26026 A | 2/2018 | |
| KR | 10-2011-0122895 A | 11/2011 | |
| KR | 10-2013-0048578 A | 5/2013 | |

(Continued)

OTHER PUBLICATIONS

Khazaei et al "A unimodal person authentication system based on signing sound" Proceedings of 2012 IEEE-EMBS International Conference on Biomedical and Health Informatics (Year: 2012).*

(Continued)

*Primary Examiner* — Sean T Motsinger
(74) *Attorney, Agent, or Firm* — Sughrue Mion, PLLC

(57) ABSTRACT

An electronic device includes an input configured to receive a signature from a user; a communication interface configured to communicate with a server; and a controller configured to classify the signature into at least one stroke, to transmit authentication information for the at least one stroke to the server, and to control the communication interface to receive a result of authentication of the signature from the server.

10 Claims, 6 Drawing Sheets

(56) References Cited

U.S. PATENT DOCUMENTS

| | | | |
|---|---|---|---|
| 5,734,882 | A | 3/1998 | Lopresti et al. |
| 6,236,740 | B1 | 5/2001 | Lee |
| 9,898,695 | B2 | 2/2018 | Suwald |
| 2003/0179912 | A1* | 9/2003 | Murase .................. G06V 40/30 382/119 |
| 2003/0179913 | A1* | 9/2003 | Murase .................. G06V 40/30 382/119 |
| 2004/0047505 | A1* | 3/2004 | Ghassabian ............. G06K 9/00 382/186 |
| 2012/0229425 | A1* | 9/2012 | Barrus ................ G06F 3/04883 345/179 |
| 2015/0071505 | A1* | 3/2015 | Kim .................... G06F 3/04883 382/119 |
| 2017/0269806 | A1 | 9/2017 | Ekambaram et al. |
| 2017/0344137 | A1* | 11/2017 | Noguchi ................ G06F 3/0383 |
| 2017/0371485 | A1* | 12/2017 | Ohi ........................ G06F 3/0383 |
| 2020/0327307 | A1* | 10/2020 | Kasatani ............. G06F 3/04883 |

FOREIGN PATENT DOCUMENTS

| | | |
|---|---|---|
| KR | 10-2015-0030558 A | 3/2015 |
| KR | 10-1789298 B1 | 11/2017 |

OTHER PUBLICATIONS

Leclerc et al., "Automatic Signature Verification: the State of the Art-1989-1993," International Journal of Pattern Recognition and Artificial Intelligence, vol. 8, No. 3, pp. 643-660, 1994.

International Search Report (PCT/ISA/210) dated Jan. 16, 2020, issued by the International Searching Authority in counterpart International Application No. PCT/KR2019/012647.

Notice of Preliminary Rejection Korean Office Action, dated Nov. 28, 2022, issued by Korean Patent Office, Application No. 10-2018-0116851.

Communication dated Jun. 23, 2023 issued by the Korean Patent Office in KR Patent Application No. 10-2018-0116851.

* cited by examiner

ELECTRONIC DEVICE, SERVER, AND SIGNATURE AUTHENTICATION METHOD USING THE SAME

TECHNICAL FIELD

The present disclosure relates to an electronic device for receiving a signature for authentication, a server, and a signature authentication method using the same.

BACKGROUND ART

Signatures and biometric information are being used as a method to identify whether a user accessing a digital device is an authorized user.

However, in order to use the biometric information, a separate sensor is required, and the use of the signature poses a security concern, such as illegal copying, as a visualized image of the signature is used.

DISCLOSURE

Technical Problem

An aspect of the present disclosure is to provide an electronic device for receiving a signature for user authentication, a server, and a signature authentication method using the same.

Technical Solution

An aspect of the disclosure provides an electronic device including: an input configured to receive a signature from a user; a communication interface configured to communicate with a server; and a controller configured to classify the signature into at least one stroke, to transmit authentication information for the at least one stroke to the server, and to control the communication interface to receive a result of authentication of the signature from the server.

The controller may be configured to classify the signature into the at least one stroke based on the signature information detected while the signature is being input.

The signature information may include information about a sound wave signal or a pressure signal detected while the signature is being input.

The controller may be configured to classify the at least one stroke included in the signature based on a waveform of the sound wave signal.

The controller may be configured to identify the authentication information based on the signature information of a section corresponding to the at least one stroke, and to control the communication interface to transmit the identified authentication information to the server.

The authentication information may include at least one of the number, order, length, size, speed, strength, spacing of strokes of the signature, or number of inflection points of the signature.

The controller may be configured to determine a start point or an end point of the at least one stroke based on a strength of the sound wave signal or the pressure signal, and to classify the signature into the at least one stroke based on the start point or the end point.

The controller may be configured to determine a point where the strength of the sound wave signal or the pressure signal is equal to or greater than a predetermined first reference value as the start point of the at least one stroke.

The controller may be configured to determine a point at which the strength of the sound wave signal or the pressure signal is not detected after the start point as the end point of the at least one stroke.

The electronic device may further include a detector configured to detect the sound wave signal generated by the signature. The controller may be configured to obtain information about the detected sound wave signal as the signature information.

Another aspect of the disclosure provides a server including: a server communication interface configured to communicate with an electronic device; a server storage configured to store user's reference authentication information; and a server controller configured to classify a signature into at least one stroke based on signature information in response to receiving the signature information from the electronic device, to compare authentication information for the at least one stroke with the reference authentication information, to authenticate the signature based on the comparison result, and to control the server communication interface to transmit a result of authentication of the signature to the electronic device.

Another aspect of the disclosure provides a signature authentication method including: receiving, by an input, a signature from a user; classifying, by a controller, the signature into at least one stroke; comparing, by the controller, authentication information for the at least one stroke with reference authentication information stored in advance; and authenticating, by the controller, the signature based on the comparison result.

The classifying of the signature into at least one stroke may include classifying the signature into the at least one stroke based on the signature information detected while the signature is being input.

The signature information may include information about a sound wave signal or a pressure signal detected while the signature is being input.

The classifying of the signature into at least one stroke may include classifying the at least one stroke included in the signature based on a waveform of the sound wave signal.

The signature authentication method may further include identifying, by the controller, the authentication information based on the signature information of a section corresponding to the at least one stroke.

The authentication information may include at least one of the number, order, length, size, speed, strength, spacing of strokes of the signature, or number of inflection points of the signature.

The classifying of the signature into at least one stroke may include determining a start point or an end point of the at least one stroke based on a strength of the sound wave signal or the pressure signal, and classifying the signature into the at least one stroke based on the start point or the end point.

The determining of the start point or the end point of the at least one stroke may include determining a point where the strength of the sound wave signal or the pressure signal is equal to or greater than a predetermined first reference value as the start point of the at least one stroke.

The determining of the start point or the end point of the at least one stroke may include determining a point at which the strength of the sound wave signal or the pressure signal is not detected after the start point as the end point of the at least one stroke.

Advantageous Effects

According to an electronic device, a server, and a signature authentication method using the same of an aspect, since information about a user's signature can be diversified, the accuracy of signature authentication may be increased.

MODES OF THE INVENTION

Figure 1:
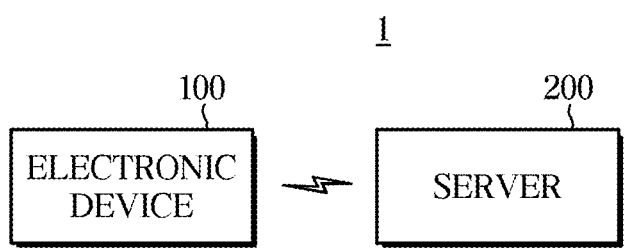
FIG. 1 is a view illustrating a signature authentication system according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

It will be understood that, although the terms first, second, third, etc., may be used herein to describe various elements, components, regions, layers and/or sections, these elements, components, regions, layers and/or sections should not be limited by these terms. These terms are only used to classify one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

FIG. 1 is a view illustrating a signature authentication system according to an embodiment.

Referring to FIG. 1, a signature authentication system 1 may include an electronic device 100 and a server 200.

In order to use payment services, reservation services, and administrative services performed online, or services such as safety checks, mail delivery, payment verification performed offline, a user may input a signature.

In order to use various services using such an electronic signature, the user may input the signature into the electronic device 100. Various information related to the signature input by the electronic device 100 may be transmitted to the server 200 and used for user authentication.

The electronic device 100 may be implemented as a computer or a portable terminal capable of communicating with the server 200 through a network. The computer may include, for example, a notebook, a desktop, a laptop, a tablet PC, a slate PC, and the like, each of which is equipped with a WEB Browser. The user terminal 200 may include, for example, a wearable device such as a Personal Communication System (PCS), or the like as a wireless communication device that is guaranteed to be portable and mobile. The portable terminal may be any type of handheld-based wireless communication device such as a Personal Communication System (PCS), Global System for Mobile communications (GSM), Personal Digital Cellular (PDC), Personal Handyphone System (PHS), Personal Digital Assistant (PDA), International Mobile Telecommunications (IMT)-2000, Code Division Multiple Access (CDMA)-2000, W-Code Division Multiple Access (W-CDMA), Wireless Broadband (WiBro) Internet terminal, a smart phone, etc., a wearable device such as a watch, a ring, a bracelet, an anklet, a necklace, a pair of glasses, and contact lens, or a head-mounted-device (HMD).

Figure 2:
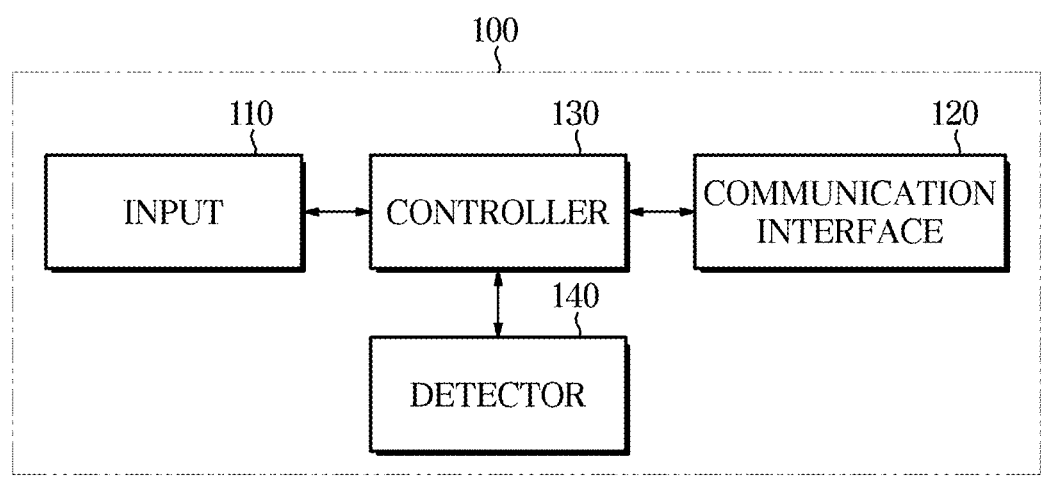
FIG. 2 is a control block diagram of an electronic device according to an embodiment.

FIG. 2 is a control block diagram of an electronic device according to an embodiment.

Referring to FIG. 2, the electronic device 100 may include an input 110, a detector 140, a communication interface 120, and a controller 130.

The input 110 may receive the signature from the user.

The input 110 may be implemented as a touch input device, that is, a software device including a graphical user interface (GUI) such as a touch pad. When the input 110 is implemented by the touch input device, the input 110 may be implemented as a touch screen. The touch screen may include a touch panel for receiving a user's touch and a display screen for displaying a shortcut icon or a result corresponding to the received touch. The touch panel may include various input methods such as a resistive method (pressure-sensitive), a capacitive method, an ultrasonic (SAW) method, or infrared (IR) method.

However, it is not limited thereto, and the input 110 may include hardware devices such as various buttons or switches, pedals, keyboards, mice, track-balls, various levers, handles, sticks, or the like for user input.

The detector 140 may detect signature information detected while receiving the signature from the user. In this case, the signature information may refer to information detected while the signature is being input, and may include information about a sound wave signal or a pressure signal detected while the signature is being input.

In this case, the information about the sound wave signal may include wave information about a fricative sound generated when the user inputs the signature through the input 110. In addition, the information about the pressure signal may include at least one of information about an strength of pressure applied to the input 110 by the user to input the signature and position information on which the pressure is applied.

The detector 140 may detect the sound wave signal or the pressure signal detected while the signature is being input. The sound wave signal or the pressure signal detected by the detector 140 may be transmitted to the controller 130 and used as a control basis.

To this end, the detector 140 may be implemented with a device such as a microphone, and the detector 140 may be implemented with various sensors. The detector 140 may be implemented as a sound wave sensor, an ultrasonic sensor, a pressure sensor, a touch sensor, a vibration sensor, or the like. In addition to this, the detector 140 may be implemented to further include an acceleration sensor and a gyro sensor.

The communication interface 120 may communicate with the server 200 under the control of the controller 130. The communication interface 120 may transmit various pieces of information related to the user's signature to the server 200 or receive from the server 200.

Particularly, the communication interface 120 may transmit the signature information or the authentication information to the server 200. In this case, the authentication information may be information identified by the controller 200, which will be described later, and may refer to detailed information about the user's signature. This will be described later.

In addition, the communication interface 120 may receive a result of authentication of the signature from the server 200.

To this end, the communication interface 120 may include one or more components that enable communication with an external device including the server 200, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, etc.

The wireless communication module may include a wireless communication interface including an antenna and a transmitter for transmitting various signals related to electronic devices 100 including the signature information or the authentication information. In addition, the wireless communication module may further include a signal converting module for converting a digital control signal output from the first controller 150 through the wireless communication interface into an analog type wireless signal under the control of the first controller 150.

The wireless communication module may include the wireless communication interface including an antenna and a receiver for receiving a signal regarding the result of authentication of the signature. In addition, the wireless communication module may further include the signal converting module for demodulating an analog type wireless signal received through the wireless communication interface into a digital control signal.

The controller 130 may generally control various components in the electronic device 100.

The controller 130 may classify the user's signature into at least one stroke. Particularly, the controller 130 may obtain the signature information detected while the user's signature is being input, and classify the signature into the at least one stroke based on the obtained signature information.

In this case, the signature information may include information about the sound wave signal or the pressure signal detected while the signature is being input. The information about the sound wave signal may include information about a strength of the sound wave over time. For example, the information about the sound wave signal may include wave information about the fricative sound generated when the user inputs the signature through the input 110. In addition, the information about the pressure signal may include information about the strength of pressure over time, and include at least one of information about the strength of pressure applied to the input 110 by the user to input the signature and the position information on which the pressure is applied.

The controller 130 may obtain the signature information by receiving the signature information from the detector 130 or from an external sensor, and may use this as the control basis.

When the signature information includes information about the sound wave signal, the controller 130 may classify the signature information into at least one section based on the waveform of the sound wave signal, and classify the at least one stroke included in the signature by matching each classified section to the at least one stroke included in the signature.

In addition, the controller 130 may identify the authentication information for the at least one stroke included in the signature. In this case, the authentication information may refer to detailed information on the user's signature, and may include at least one of the number, order, length, size, speed, strength, spacing of strokes included in the signature, or the number of inflection points present in at least one stroke. Among them, the length, size, speed, strength, and spacing of the stroke may refer to a relative value between the at least one stroke. That is, it may refer to a relative length, a relative size, a relative speed, a relative strength, and a relative spacing between the at least one stroke.

Particularly, the controller 130 may identify the authentication information based on the signature information of the section corresponding to at least one stroke. The controller 130 may classify the signature information into sections corresponding to at least one stroke, and may identify the authentication information for the stroke corresponding to the corresponding section based on the signature information of each section.

In this case, the controller 130 may generate the authentication information by identifying the authentication information for each of at least one stroke.

In order to identify the authentication information, the controller 130 may digitalize the signature information, and may identify the authentication information for at least one stroke included in the signature based on the digitalized signature information.

In this case, the controller 130 may digitalize the signature information according to a predetermined level value, and may set a level value differently according to a security level. That is, as the security level increases, the controller 130 may digitalize the signature information based on a higher level value.

In addition, the controller 130 may encode the authentication information and use the authentication information as the control basis. To this end, the controller 130 may include a signal conversion module such as an analog-digital converter (ADC).

The controller 130 may control the communication interface 120 to transmit various information related to the signature, such as the signature information or the authentication information, to the server 200 and receive whether the signature is authenticated from the server 200.

Through this, the controller 130 may improve the accuracy of signature authentication by identifying various encoded authentication information for the signature. In addition, since the controller 130 does not generate visual information for the signature input from the user, but generates encoded authentication information, security problems such as illegal copying may be prevented.

The controller 120 may be implemented with the memory storing an algorithm to control operation of the components in the electronic device 100 or data about a program that implements the algorithm, and the processor carrying out the aforementioned operation using the data stored in the memory. The memory and the processor may be implemented in separate chips. Alternatively, the memory and the processor may be implemented in a single chip.

The storage may store information used as the control basis by the controller 100 or various information related to the signature generated by the controller 100.

The storage may store the obtained signature information, and may store the authentication information identified from the signature information. In this case, the storage may store the signature information in the form of a sound source.

The storage may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto. The storage may be a memory implemented with a chip separate from a processor, which is will be described below in relation to the controller 130. The storage may be implemented integrally with the processor in a single chip.

Figure 3:
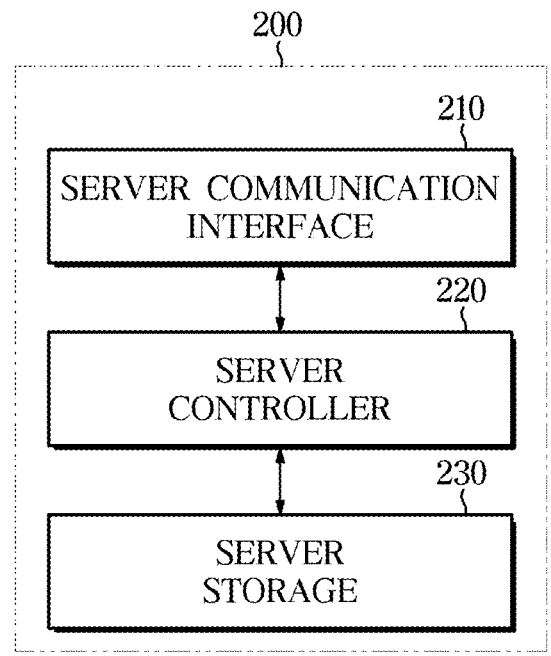
FIG. 3 is a control block diagram of a server according to an embodiment.

FIG. 3 is a control block diagram of a server according to an embodiment.

Referring to FIG. 3, the server 200 may include a server communication interface 210, a server storage 230, and a server controller 220.

The server communication interface 210 may exchange various information related to the user's signature with the communication interface 120 of the electronic device 100.

The server communication interface 210 may receive the signature information or the authentication information from the communication interface 120 and may transmit the result of authentication of the signature to the communication interface 120. In this case, the signature information received from the communication interface 120 by the server communication interface 210 may be the information related to the sound wave signal or the pressure signal detected while the signature is being input. When the signature information is the sound wave signal, the server communication interface 210 may receive the sound source of the fricative detected while the signature is input from the communication interface 120.

To this end, the server communication interface 210 may include one or more components that enable communication with external devices such as the electronic device 100, for example, at least one of the short-range communication module, the wired communication module, and the wireless communication module. Description of this is the same as described above.

The server storage 230 may store reference authentication information, which is a reference for authenticating the signature. In this case, the reference authentication information may refer to the authentication information for the authenticated signature. The server storage 230 may store the reference authentication information for each user.

In addition to this, the server storage 230 may store various types of information necessary for authenticating the signature.

To this end, the server storage 230 may be implemented with at least one of the non-volatile memory device or the storage medium, and a description thereof has been described above and thus will be omitted. The server storage 230 may be the memory implemented as the separate chip from the processor described above with respect to the server controller 220, or may be implemented with the processor and the single chip.

The server controller 220 may authenticate the signature based on the authentication information.

The server controller 220 may compare the authentication information and pre-stored reference authentication information, and may authenticate the signature based on the comparison result.

Particularly, the server controller 220 may identify whether the authentication information and the user's pre-stored standard authentication information match. To this end, the server controller 220 may determine a degree of similarity between the authentication information and the reference authentication information. When the determined similarity is greater than or equal to a predetermined reference value, the server controller 220 may identify that the authentication information matches the pre-stored reference authentication information.

When the authentication information and the pre-stored standard authentication information match, the server controller 220 may authenticate the signature and transmit the authentication result to the electronic device 100.

Meanwhile, the server controller 220 may compare the authentication information with each of the pre-stored reference authentication information, and may apply a weight to the comparison result for each authentication information.

In this case, the server controller 220 may apply different weights for each authentication information.

To this end, the server controller 220 may learn the authentication information by storing the authentication information, and may identify the variability of the authentication information based on the learned data. The server controller 220 may set the weight for the authentication information whose volatility is greater than or equal to the predetermined value to be lower than the weight for authentication information whose volatility is less than the predetermined value. Through this, the server controller 220 may apply the different weights for each authentication information so as not to influence whether or not to authenticate the authentication information having relatively large variability. Therefore, the accuracy of the signature authentication may be increased.

When the server controller 220 authenticates the signature, the authentication information used as the control basis may be received from the electronic device 100 or generated by the server controller 220 based on the signature information received from the electronic device 100.

To this end, the server controller 220 may classify the user's signature into at least one stroke or identify the authentication information for the signature in the same manner as the controller 130 of the electronic device 100.

Particularly, the server controller 220 may classify the user's signature into at least one stroke based on the signature information received from the electronic device 100. In this case, the signature information received from the electronic device 100 by the server controller 220 may include the sound source of the sound wave signal detected while the signature is being input. For example, the signature information received from the electronic device 100 may be the sound source of the fricative detected while the signature is being input. However, the present disclosure is not limited thereto, and information related to the pressure signal may be included.

When the signature information includes information about the sound wave signal, the server controller 220 may classify the signature information into at least one section based on the waveform of the sound wave signal, and classify the at least one stroke included in the signature by matching each classified section to the at least one stroke included in the signature.

In addition, the server controller 220 may identify the authentication information for the at least one stroke included in the signature. In this case, the authentication information may refer to detailed information about the user's signature, and may include at least one of the number, order, length, size, speed, strength, spacing of strokes included in the signature, or the number of inflection points present in at least one stroke. Among them, the length, size, speed, strength, and spacing of the stroke may refer to the relative value between the at least one stroke. That is, it may refer to the relative length, the relative size, the relative speed, the relative strength, and the relative spacing between the at least one stroke.

Particularly, the server controller 220 may identify the authentication information based on the signature information of the section corresponding to at least one stroke. The server controller 220 may classify the signature information into sections corresponding to at least one stroke, and may identify the authentication information for the stroke corresponding to the corresponding section based on the signature information of each section.

In this case, the server controller 20 may generate the authentication information by identifying the authentication information for each of at least one stroke.

In order to identify the authentication information, the server controller 220 may digitalize the signature information, and may identify the authentication information for at least one stroke included in the signature based on the digitalized signature information.

In this case, the server controller 20 may digitalize the signature information according to the predetermined level value, and may set the level value differently according to the security level. That is, as the security level increases, the controller 130 may digitalize the signature information based on a higher level value.

In addition, the server controller 220 may encode the authentication information and use the authentication information as the control basis. To this end, the server controller 220 may include the signal conversion module such as the ADC.

In order to authenticate the signature, the server controller 220 may authenticate the signature based on the authentication information identified based on the authentication information received from the electronic device 100 as well as the signature information received from the electronic device 100 as described above.

Through this, the server controller 220 may improve the accuracy of signature authentication by identifying various encoded authentication information for the signature. In addition, since the server controller 220 does not generate visual information for the signature input from the user, but generates encoded authentication information, security problems such as illegal copying may be prevented.

At least one component may be added or deleted corresponding to the performance of the components of the electronic device 100 and the server 200 illustrated in FIGS. 2 and 3. It should be readily understood by a person of ordinary skill in the art that the relative positions of the components may be changed corresponding to the performance or structure of the system.

Each of the components illustrated in FIGS. 2 and 3 may refers to a software component and/or a hardware component such as a Field Programmable Gate Array (FPGA) and an Application Specific Integrated Circuit (ASIC).

Hereinafter, an operation for the electronic device 100 or the server 200 to classify the signature into at least one stroke and the operation for identifying authentication information for the signature will be described in detail with reference to FIGS. 4 to 7.

Figure 4:
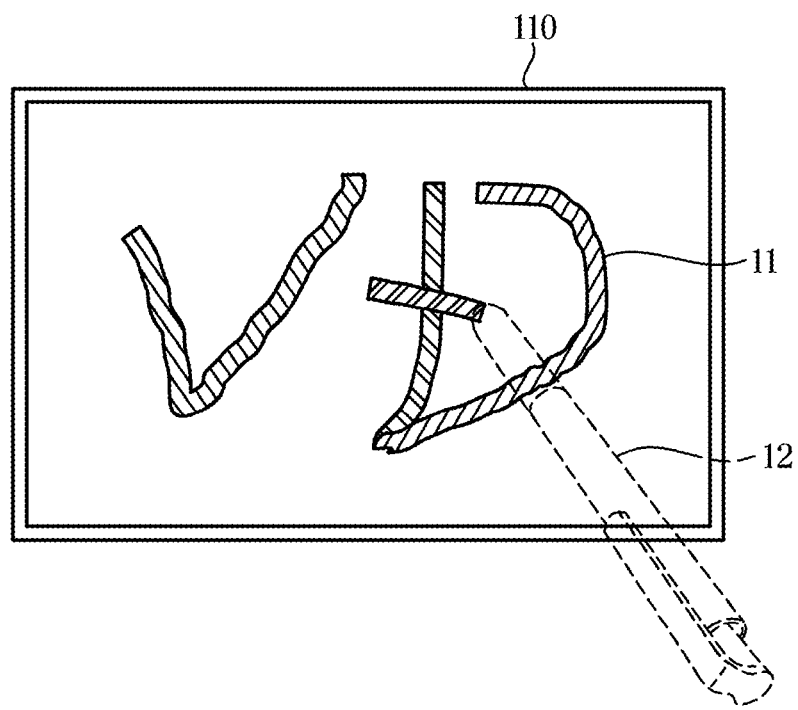
FIG. 4 is a view illustrating an embodiment of receiving a user's signature according to an embodiment.
Figure 5:
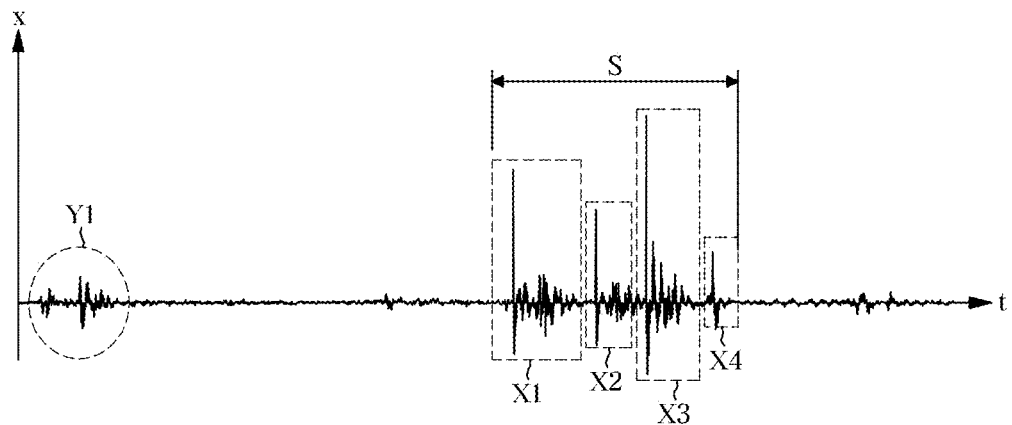
FIG. 5 is a view illustrating an operation of classifying a signature by an electronic device according to an embodiment.
Figure 7:
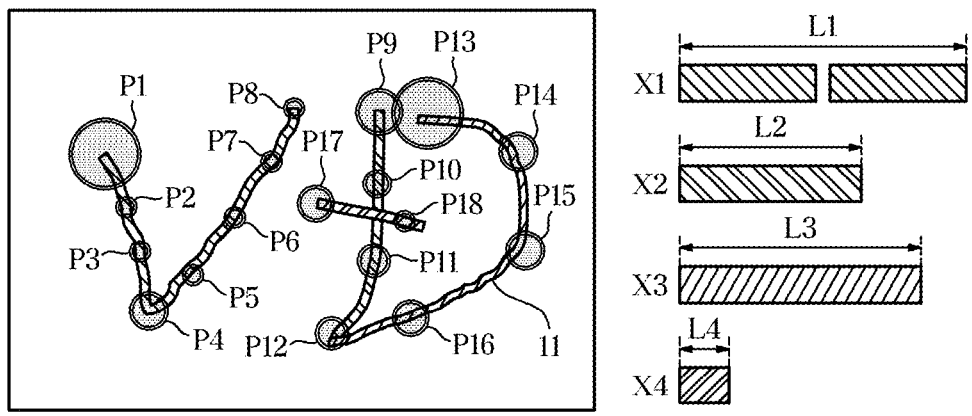
FIG. 7 is a view illustrating a process of identifying authentication information by an electronic device according to an embodiment.

FIG. 4 is a view illustrating an embodiment of receiving a user's signature according to an embodiment, FIG. 5 are views illustrating an operation of classifying a signature by an electronic device according to an embodiment, and FIG. 7 is a view illustrating a process of identifying authentication information by an electronic device according to an embodiment.

However, as described above, since the server controller 220 may perform the same operation of classifying the signature and identifying the authentication information of the controller 130, the description of the controller 130 may be applied equally to the server controller 220.

Referring to FIG. 4, the electronic device 100 may receive a signature 11 from the user through the input 110. The user may input the signature 11 on the electronic device 100 using a stylus pen 12. In this case, the user may not only use an input tool such as the stylus pen 12 but also input the signature 11 using a finger, but is not limited thereto.

While the user inputs the signature 11, a friction may occur on the surface of the stylus pen 12 or the finger and the input 110 on the input 110, and the sound wave signal such as the fricative sound may be generated by the friction.

In addition, when the input 110 is implemented as the touch panel, a pressure signal or an electric signal may be generated by a user's signature input.

As illustrated in FIG. 5, the signature information including the information about sound wave signals generated while the signature 11 is being input may be transmitted to the controller 130. In this case, the signature information may include an strength x of the sound wave signal with respect to time, and the strength x of the sound wave signal may be a quantized value for a predetermined time interval.

The controller 130 may classify at least one stroke included in the signature 11 based on the waveform of the sound wave signal. In this case, the controller 130 may identify the strength of the sound wave signal, the amount of change in strength over time, and the like from the waveform of the sound wave signal, and use this to classify at least one stroke included in the signature 11.

The strength of the sound wave detected while one stroke of the signature is being input may gradually decrease as the stroke progresses from the start point to the end point. The controller 130 may classify at least one section X1, X2, X3, and X4 in which the waveform of the sound wave has an attenuation form. The controller 130 may classify the signature into the at least one stroke by corresponding to each of the at least one section X1, X2, X3, and X4 separated by each of the at least one stroke included in the signature.

For example, the controller 130 may correspond to a first section X1 having the attenuated waveform to a first stroke, a second section X2 to a second stroke, and a third section X3 to a third stroke, a fourth section X4 to a fourth stroke, respectively, and the signature may be classified into the first stroke, the second stroke, the third stroke, and the fourth stroke.

Alternatively, the controller 130 may determine a start point or an end point of the at least one stroke based on the strength of the sound wave signal, and classify the signature into the at least one stroke based on the start point and the end point.

Particularly, the controller 130 may identify a point at which the strength of the sound wave signal is equal to or greater than a predetermined first reference value as a point at which the stylus pen 12 is grounded, that is, the start point of the stroke, in order for the user to input the signature.

In this case, the controller 130 may identify a point where an amount of change in the strength of the sound wave signal before and after a predetermined time interval is equal to or greater than a predetermined second reference value as the start point of the stroke. That is, the controller 130 may determine a point where a relative strength of the sound wave signal is equal to or greater than a predetermined second reference value as the start point of the stroke.

In addition, the controller 130 may determine a point at which the strength of the sound wave signal is not detected as the end point of the stroke. The controller 130 may determine a point at which the strength of the sound wave signal is not detected after the start point of one stroke as the end point of the stroke.

In this case, the controller 130 may identify a point where the amount of change in the strength of the sound wave signal before and after a predetermined time interval is less than a predetermined third reference value as the end point of the stroke. That is, the controller 130 may determine a point where the relative strength of the sound wave signal is less than the third predetermined reference value as the end point of the stroke.

The controller 130 may classify the input signature into the at least one stroke based on the determined start and end points of the stroke. The controller 130 may determine a section from the point identified as the start point of the stroke to the point identified as the end point of the stroke among information about the sound wave signal included in the signature information as a section corresponding to one stroke.

Figure 6:
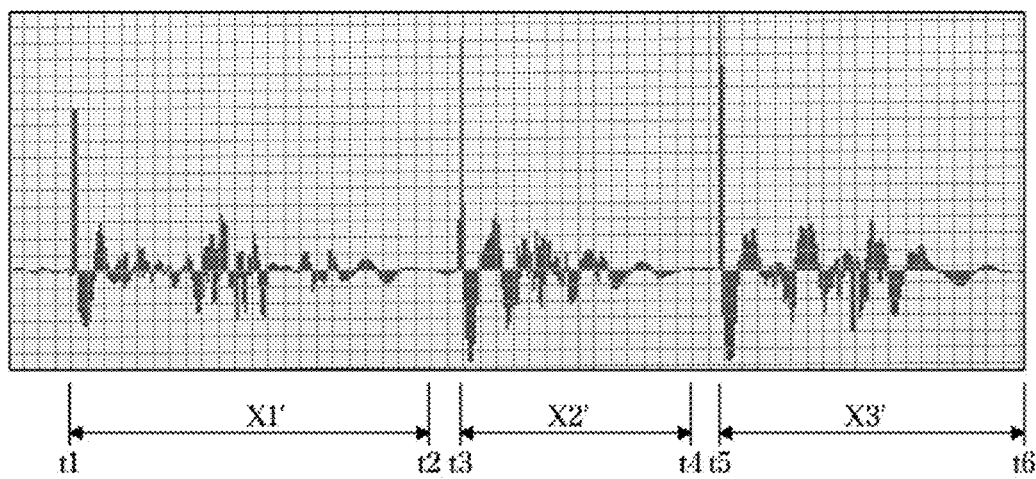
FIG. 6 is a view illustrating an operation of classifying a signature by an electronic device according to an embodiment.

For example, as illustrated in FIG. 6, the controller 130 may determine points t1, t3, and t5 in which the strength of the sound wave signal is equal to or greater than the predetermined first reference value as the starting point of each stroke. Alternatively, the controller 130 may determine the points t1, t3, and t5 in which the amount of change in the strength of the sound wave signal before and after the predetermined time interval is equal to or greater than the predetermined second reference value as the start point of the stroke.

In addition, the controller 130 may determine a point t2 at which the strength of the sound wave signal is not detected after the first start point t1 as the end point of the stroke corresponding to a X1' section, a point t4 at which the strength of the sound wave signal is not detected after the first start point t3 as the end point of the stroke corresponding to a X2' section, and a point t6 at which the strength of the sound wave signal is not detected after the first start point t5 as the end point of the stroke corresponding to a X3' section.

Meanwhile, even when the user or the like does not input the signature, there may be the case where the sound wave is detected. For example, there may be a case that is not related to the input of the signature such as where the user's hand rubbing against the input 110.

Even if there is a section in which the waveform of the sound wave signal has the attenuation form, the controller 130 may determine the sound wave signal in which the strength of the sound wave signal included in the corresponding section is less than a predetermined fourth reference value as noise (Y1 of FIG. 5). In this case, the controller 130 may determine a section in which the strength of the sound wave signal is equal to or greater than the predetermined fourth reference value as a valid section (S in FIG. 5) in which the user's signature is estimated to be input.

Through this, since the controller 130 can remove noise due to noise in a surrounding environment, the accuracy of signature authentication may be increased.

In addition, the controller 130 may identify the authentication information based on the signature information of the section corresponding to the at least one stroke. Particularly, the controller 130 may identify the authentication information for the corresponding stroke based on signature information included in the section corresponding to the at least one stroke.

For example, when the signature information is classified into the first section X1, the second section X2, the third section X3, and the fourth section X4, the controller 130 may identify the authentication information for the first stroke based on the signature information of the first section X1, identify the authentication information for the second stroke based on the signature information of the second section X2, identify the authentication information for the third stroke based on the signature information of the third section X3, and identify the authentication information for the fourth stroke based on the signature information of the fourth section X4.

In this case, the authentication information may include at least one of the number, order, length, size, speed, strength, spacing of the at least one stroke included in the signature, or the number of inflection points included in the at least one stroke. Among them, the length, size, speed, strength, and spacing of the stroke may refer to the relative value between the at least one stroke. That is, it may refer to the relative length, the relative size, the relative speed, the relative strength, and the relative spacing between the at least one stroke.

The controller 130 may identify the number of strokes based on the number of classified sound wave signal sections, and may identify the order of the strokes based on the order of the sound wave signal sections. In addition, the controller 130 may identify the length of the stroke based on the time of each sound wave signal section, that is, the time taken from the start point to the end point of the stroke, and may identify the size of the stroke based on an amplitude value of the sound wave signal. In addition, the controller 130 may identify the speed of the stroke based on the speed of the sound wave signal, and may identify the strength of the stroke based on a wave height of the sound wave signal. In addition, the controller 130 may identify the spacing of the stroke based on the interval of the sound wave signal section, and identify the number of inflection points included in the stroke based on the presence or absence of the sound wave having a strength greater than or equal to the predetermined fourth reference value.

In particular, the inflection point may refer to a point at which the stroke is bent or rotated, and the controller 130 may identify the number of sound waves having a strength of a predetermined ratio based on the strength of the sound wave at the start point of the stroke as the number of inflection points. In this case, the controller 130 may determine a value of the predetermined ratio based on the strength of the sound wave at the start point of the stroke as the fourth reference value.

For example, as illustrated in FIG. 7, when the user inputs the signature 11, the controller 130 may classify the signature 11 based on the signature information into first strokes p1 to p8, second strokes p9 to p12, third strokes p13 to p16, and fourth strokes p17 and p18. In this case, p1 to p18 denote hitting points according to a predetermined time interval. That is, a longer the distance between the hitting points, a faster the stroke speed, and a closer the distance between the hitting points, a slower the stroke speed. In addition, a size of each hitting point may refer to the strength of the sound wave signal or the pressure signal at the hitting point.

The controller 130 may identify the authentication information for the first stroke based on the sound wave signal of the first section X1 corresponding to the first stroke, and may identify a length L1 of the first stroke based on a time of the first section X1. Similarly, the controller 130 may identify a length L2 of the second stroke based on a time of the second section X2, identify a length L3 of the third stroke based on a time of the third section X3, and identify a length L4 of the fourth stroke based on a time of the fourth section X4.

In particular, when the strength of the sound wave at point p4 included in the first stroke has the value of the predetermined ratio based on the strength of the sound wave at the start point of the first stroke and the point p1, the controller 130 may determine the point p4 as the inflection point of the first stroke.

The controller 130 may generate the authentication information by identifying the relative value between the strokes as well as the absolute value of the number, order, length, size, speed, strength, spacing, or the number of inflection points included in at least one stroke.

Through this, the controller 130 may classify the user's signature into at least one or more units and strokes, and may generate more diverse authentication information for each of the classified units. By performing the signature authentication based on such various authentication information, the controller 130 may more accurately detect the user's own handwriting. Accordingly, the accuracy of signature authentication and user convenience may be increased. At the same time, since visual information for the signature is not used, security may be enhanced.

In the above, the operation of the controller 130 for classifying the signature into the at least one stroke based on the signature information exemplifying the information about the sound wave signal and identifying the authentication information for this has been described. However, the signature information is not limited thereto, and the above-described operation of the controller 130 may be equally applied to the signature information including information about the pressure signal detected while the signature is being input.

Figure 8:
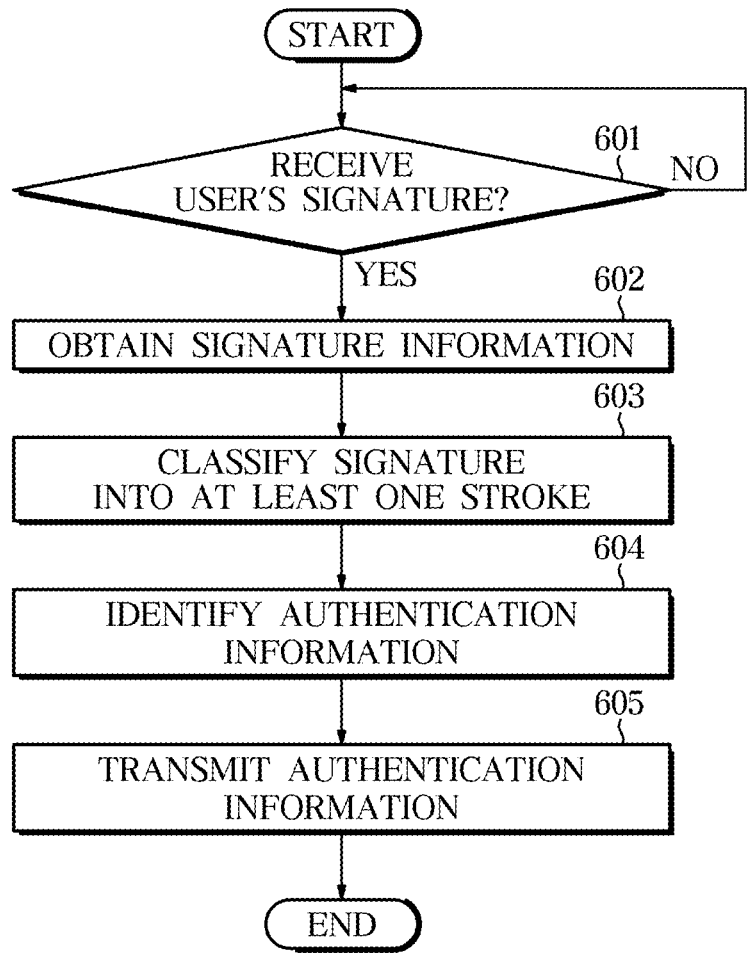
FIG. 8 is a flowchart of a signature authentication method according to an embodiment.

FIG. 8 is a flowchart of a signature authentication method according to an embodiment.

The electronic device 100 may identify whether the user's signature is received (601), and when the user's signature is received (YES in 601), the electronic device 100 may obtain the signature information (602).

In this case, the signature information may refer to the information detected while the signature is being input, and may include the information about the sound wave signal or the pressure signal detected while the signature is being input. Among them, the information about the sound wave signal may include wave information about the fricative sound generated when the user inputs the signature through the electronic device 100. In addition, the information about the pressure signal may include at least one of information about the strength of pressure applied to the electronic device 100 by the user to input the signature and position information on which the pressure is applied. The electronic device 100 may obtain the signature information by detecting the signature information or receiving the signature information from an external sensor.

Thereafter, the electronic device 100 may classify the signature into the at least one stroke (603). Particularly, the electronic device 100 may classify the signature into the at least one stroke based on the obtained signature information.

In this case, when the signature information includes information about the sound wave signal, the electronic device 100 may classify the signature information into the at least one section based on the waveform of the sound wave signal, and classify the at least one stroke included in the signature by matching each classified section to the at least one stroke included in the signature.

The electronic device 100 may identify the strength of the sound wave signal, the amount of change in strength over time, etc. from the waveform of the sound wave signal, and may use this to classify the at least one stroke included in the signature 11.

Alternatively, the electronic device 100 may determine the start point or the end point of the at least one stroke based on the strength of the sound wave signal, and may classify the signature into the at least one stroke based on the start point and the end point.

After classifying the signature into the at least one stroke, the electronic device 100 may identify the authentication information for at least one stroke (604). In this case, the authentication information may refer to detailed information about the user's signature, and may include at least one of the number, order, length, size, speed, strength, spacing of strokes included in the signature, or the number of inflection points present in at least one stroke. Among them, the length, size, speed, strength, and spacing of the stroke may refer to the relative value between the at least one stroke. That is, it may refer to the relative length, the relative size, the relative speed, the relative strength, and the relative spacing between the at least one stroke.

Particularly, the electronic device 100 may identify the authentication information for the corresponding stroke based on the signature information included in the section corresponding to at least one stroke.

The electronic device 100 may identify the number of strokes based on the number of classified sound wave signal sections, and may identify the order of strokes based on the order of the sound wave signal sections. In addition, the electronic device 100 may identify the length of the stroke based on the time of each sound wave signal section, that is, the time taken from the start point to the end point of the stroke, and may identify the size of the stroke based on the amplitude value of the sound wave signal. In addition, the electronic device 100 may identify the speed of the stroke based on the speed of the sound wave signal, and may identify the strength of the stroke based on the wave height of the sound wave signal. In addition, the electronic device 100 may identify the spacing of the stroke based on the interval of the sound wave signal section, and identify the number of inflection points included in the stroke based on the presence or absence of the sound wave having a strength greater than or equal to the predetermined fourth reference value.

In particular, the inflection point may refer to the point at which the stroke is bent or rotated, and the electronic device 100 may identify the number of sound waves having the strength of the predetermined ratio based on the strength of the sound wave at the start point of the stroke as the number of inflection points. In this case, the electronic device 100 may determine a value of the predetermined ratio based on the strength of the sound wave at the start point of the stroke as the fourth reference value.

Upon identifying the authentication information, the electronic device 100 may transmit the authentication information to the server 200 (605).

Through this, the electronic device 100 may improve the accuracy of signature authentication by identifying various encoded authentication information for the signature. In addition, since the electronic device 100 does not generate visual information for the signature input from the user, but generates encoded authentication information, security problems such as illegal copying may be prevented.

Figure 9:
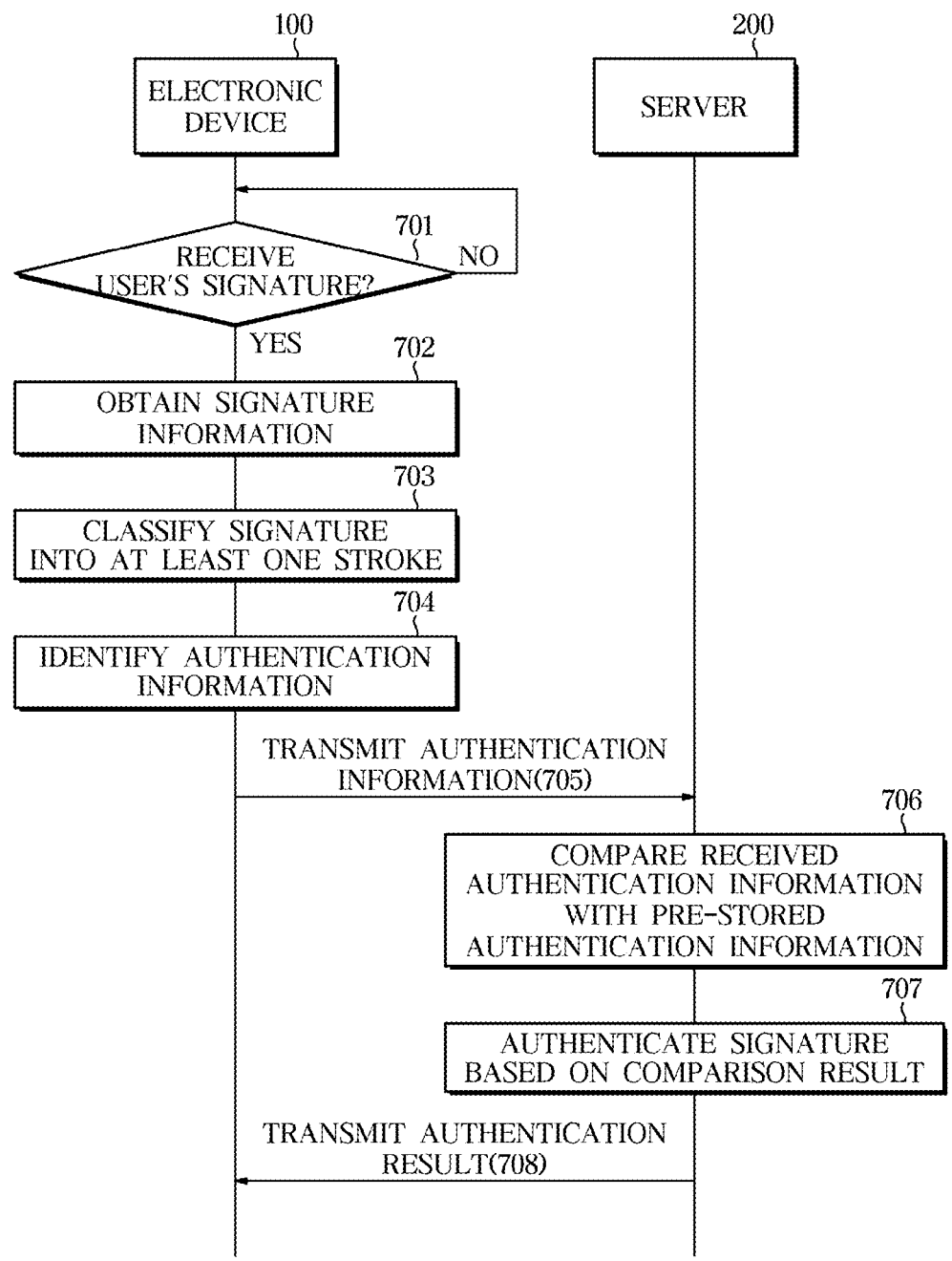
FIG. 9 is a flowchart of a signature authentication method according to an embodiment.

FIG. 9 is a flowchart of a signature authentication method according to an embodiment.

Referring to FIG. 9, the electronic device 100 may identify whether the user's signature is received (701), and when the user's signature is received (YES in 701), the electronic device 100 may obtain the signature information (702).

Upon obtaining the signature information, the electronic device 100 may classify the signature into the at least one stroke (703) and identify the authentication information (704). After identifying the authentication information, the electronic device 100 may transmit the authentication information to the server 200 (705).

Operations 701 to 705 described above are the same as operations 601 to 605 of FIG. 8, and detailed descriptions will be omitted.

Thereafter, the server 200 may compare the authentication information received from the electronic device 100 with the pre-stored reference authentication information (706), and authenticate the signature based on the comparison result (707).

Particularly, the server 200 may identify whether the authentication information and the user's pre-stored standard authentication information match. To this end, the server 200 may determine a degree of similarity between the authentication information and the reference authentication information. When the determined similarity is greater than or equal to a predetermined reference value, the server 200 may identify that the authentication information matches the pre-stored reference authentication information.

When the identified authentication information and the pre-stored standard authentication information match, the server 200 may authenticate the signature and transmit the authentication result to the electronic device 100 (708).

Through this, since the server 200 authenticates the signature using various encoded authentication information for the signature, it is possible to improve the accuracy of signature authentication. In addition, since the server 200 does not generate visual information for the signature input from the user, but generates encoded authentication information, security problems such as illegal copying may be prevented.

Figure 10:
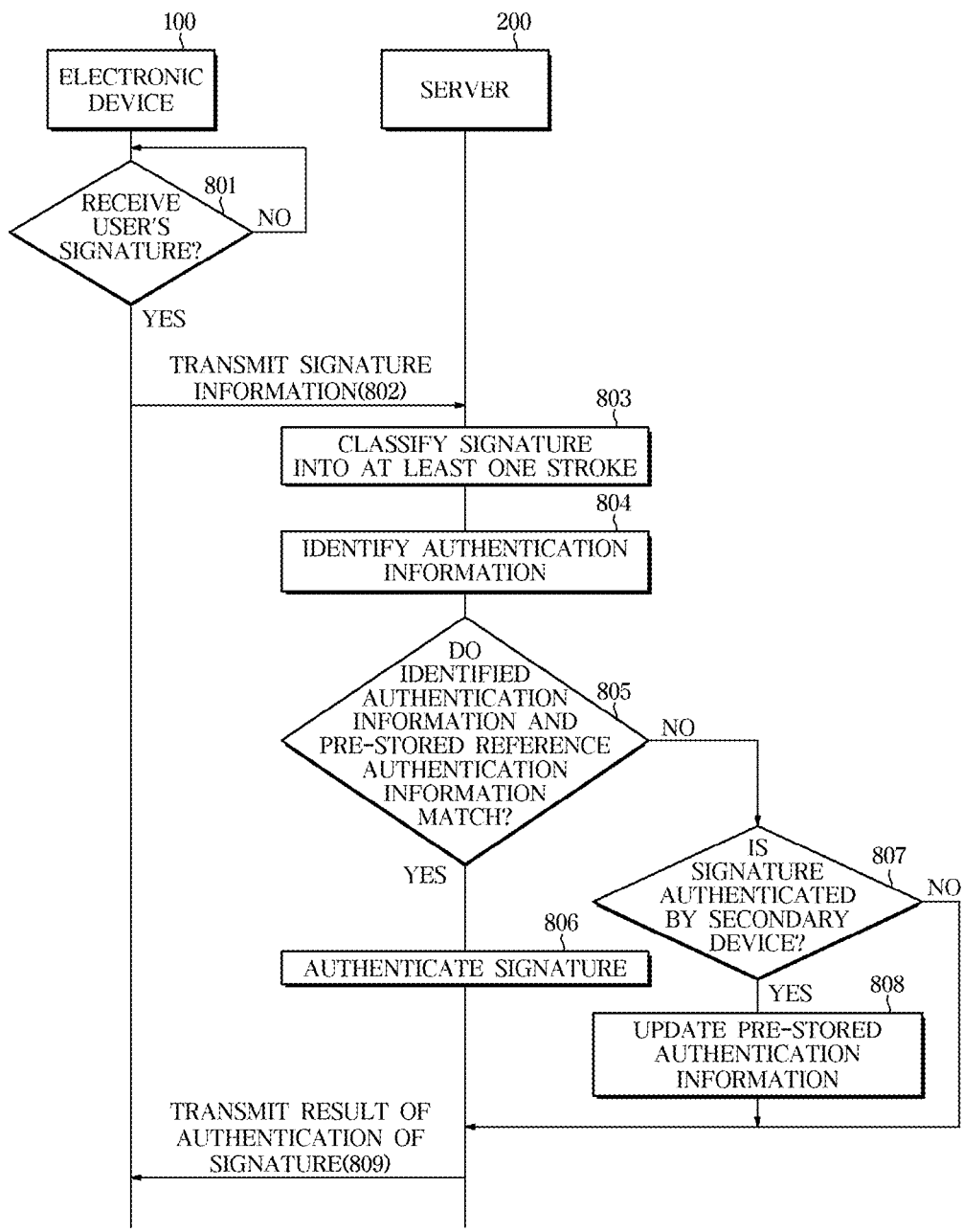
FIG. 10 is a flowchart of a signature authentication method according to an embodiment.

FIG. 10 is a flowchart of a signature authentication method according to an embodiment.

Referring to FIG. 10, the electronic device 100 may identify whether the user's signature is received (801), and when the user's signature is received (YES in 801), the electronic device 100 may transmit the signature information to the server 200 (802).

In this case, the signature information transmitted from the electronic device 100 to the server 200 may include the sound source of the sound wave signal detected while the signature is being input. For example, the signature information transmitted from the electronic device 100 to the server 200 may be the sound source of the fricative detected while the signature is being input. However, the present disclosure is not limited thereto, and the information related to the pressure signal may be included.

Upon receiving the signature information from the electronic device 100, the server 200 may classify the signature into the at least one stroke (803).

In this case, when the signature information includes information about the sound wave signal, the server 200 may classify the signature information into the at least one section based on the waveform of the sound wave signal, and classify the at least one stroke included in the signature by matching each classified section to the at least one stroke included in the signature.

The server 200 may identify the strength of the sound wave signal, the amount of change in strength over time, etc. from the waveform of the sound wave signal, and may use this to classify the at least one stroke included in the signature 11.

Alternatively, the server 200 may determine the start point or the end point of the at least one stroke based on the strength of the sound wave signal, and may classify the signature into the at least one stroke based on the start point and the end point.

After classifying the signature into the at least one stroke, the server 200 may identify the authentication information for at least one stroke (804). In this case, the authentication information may refer to detailed information about the user's signature, and may include at least one of the number, order, length, size, speed, strength, spacing of strokes included in the signature, or the number of inflection points present in at least one stroke. Among them, the length, size, speed, strength, and spacing of the stroke may refer to the relative value between the at least one stroke. That is, it may refer to the relative length, the relative size, the relative speed, the relative strength, and the relative spacing between the at least one stroke.

Particularly, the server 200 may identify the authentication information for the corresponding stroke based on the signature information included in the section corresponding to at least one stroke.

The server 200 may identify the number of strokes based on the number of classified sound wave signal sections, and may identify the order of strokes based on the order of the sound wave signal sections. In addition, the server 200 may identify the length of the stroke based on the time of each sound wave signal section, that is, the time taken from the start point to the end point of the stroke, and may identify the size of the stroke based on the amplitude value of the sound wave signal. In addition, the server 200 may identify the speed of the stroke based on the speed of the sound wave signal, and may identify the strength of the stroke based on the wave height of the sound wave signal. In addition, the server 200 may identify the spacing of the stroke based on the interval of the sound wave signal section, and identify the number of inflection points included in the stroke based on the presence or absence of the sound wave having the strength greater than or equal to the predetermined fourth reference value.

In particular, the inflection point may refer to the point at which the stroke is bent or rotated, and the server 200 may identify the number of sound waves having the strength of the predetermined ratio based on the strength of the sound wave at the start point of the stroke as the number of inflection points. In this case, the server 200 may determine the value of the predetermined ratio based on the strength of the sound wave at the start point of the stroke as the fourth reference value.

After identifying the authentication information, the server 200 may identify whether the identified authentication information and the pre-stored reference authentication information match (805). To this end, the server 200 may determine the similarity between the received authentication information and the reference authentication information. When the determined similarity is greater than or equal to the predetermined reference value, the server 200 may identify that the identified authentication information and the pre-stored reference authentication information match.

When the identified authentication information and the pre-stored reference authentication information match (YES in 805), the server 200 may authenticate the signature (806), and may transmit the result of authentication of the signature to the electronic device 100 (809).

As another example, when the identified authentication information and the pre-stored reference authentication information do not match (NO in 805), the server 200 may identify whether the signature is authenticated by a secondary device (807). In this case, the secondary device may refer to a user authentication device other than a signature, and may include a device for detecting the user's bio-signal, or the like.

When the user is authenticated as the secondary device and the signature is authenticated (YES in 807), the server 200 may update the pre-stored reference authentication information (808). Particularly, the server 200 may update the reference authentication information by changing the pre-stored reference authentication information based on the identified authentication information and storing it.

Through this, since the signature can be authenticated using various authentication information, the accuracy of signature authentication may be increased. In addition, since the signature is authenticated using the encoded authentication information, not the visual information, security problems such as illegal copying of the signature may be prevented. Therefore, the accuracy and security of the signature authentication may be increased.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

The invention claimed is:

1. An electronic device comprising:
   an input configured to receive a signature from a user;
   a detector configured to detect a sound wave signal generated by the signature input from the user;
   a communication interface configured to communicate with a server; and
   a controller configured to:
      based on at least one section of the detected sound wave signal being an attenuated form, classify the signature into at least one stroke corresponding to the at least one section;
      transmit authentication information for the classified at least one stroke to the server; and
      control the communication interface to receive a result of authentication of the signature from the server.

2. The electronic device according to claim 1, wherein the detector is further configured to detect a pressure signal generated by the input signature from the user.

3. The electronic device according to claim 1, wherein the controller is further configured to:
   identify the authentication information based on the detected sound wave signal of a section corresponding to the at least one stroke; and
   control the communication interface to transmit the identified authentication information to the server.

4. The electronic device according to claim 1, wherein the authentication information comprises at least one of a number, order, length, size, speed, strength, spacing of strokes of the signature, or a number of inflection points of the signature.

5. The electronic device according to claim 3, wherein the controller is further configured to:
   determine a start point or an end point of the at least one stroke based on a strength of the sound wave signal or the pressure signal, and
   classify the signature into the at least one stroke based on the start point or the end point.

6. The electronic device according to claim 5, wherein the controller is further configured to determine a point where the strength of the sound wave signal or the pressure signal is equal to or greater than a predetermined first reference value as the start point of the at least one stroke.

7. The electronic device according to claim 5, wherein the controller is further configured to determine a point at which the strength of the sound wave signal or the pressure signal is not detected after the start point as the end point of the at least one stroke.

8. A server comprising:
   a server communication interface configured to communicate with an electronic device;
   a server storage configured to store reference authentication information of a user; and
   a server controller configured to:
      in response to receiving the signature information including a sound wave signal generated by a signature input by the user from the electronic device, based on at least one section of the detected sound wave signal being an attenuate form, classify the signature into at least one stroke corresponding to the at least one section,
      compare authentication information for classified the at least one stroke with the reference authentication information,
      authenticate the signature based on the comparison result, and
      control the server communication interface to transmit a result of authentication of the signature to the electronic device,
   wherein the controller is further configured to classify the signature into the at least one stroke based on the signature information detected while the signature is being input, and
   wherein the signature information comprises information about a wave form of a sound wave signal caused by a fricative sound.

9. A signature authentication method comprising:
   receiving, by an input, a signature from a user;
   detecting, by a detector, a sound wave signal generated by the signature input from the user;
   based on at least one section of the detected sound wave signal being an attenuated form, classifying, by a controller, the signature into at least one stroke corresponding to the at least one section;
   comparing, by the controller, authentication information for the classified at least one stroke with reference authentication information stored in advance; and
   authenticating, by the controller, the signature based on the comparison result.

10. The signature authentication method according to claim 9, further comprising detecting, by the detector, a pressure signal generated by the signature input from the user.

* * * * *